United States Patent
Park et al.

(10) Patent No.: US 9,115,791 B2
(45) Date of Patent: Aug. 25, 2015

(54) SHIFTING APPARATUS FOR ELECTRIC VEHICLE

(71) Applicant: Hyundai Motor Company, Seoul (KR)

(72) Inventors: Jong Yun Park, Hwaseong-si (KR); Soon Ki Eo, Ansan-si (KR); Min Wook Lee, Gwangju (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/243,356

(22) Filed: Apr. 2, 2014

(65) Prior Publication Data

US 2015/0111682 A1    Apr. 23, 2015

(30) Foreign Application Priority Data

Oct. 17, 2013  (KR) .................. 10-2013-0123959

(51) Int. Cl.
*F16H 48/06* (2006.01)
*F16H 3/44* (2006.01)
*B60K 1/00* (2006.01)

(52) U.S. Cl.
CPC ... *F16H 3/44* (2013.01); *B60K 1/00* (2013.01)

(58) Field of Classification Search
None
See application file for complete search history.

(56) References Cited

U.S. PATENT DOCUMENTS

| | | | | |
|---|---|---|---|---|
| 2,115,963 A | * | 5/1938 | Osborne | 475/312 |
| 2,159,980 A | * | 5/1939 | Banker | 475/298 |
| 2,198,072 A | * | 4/1940 | Banker | 475/260 |
| 2,241,087 A | * | 5/1941 | Griswold | 475/154 |
| 2,771,795 A | * | 11/1956 | Palmer | 475/301 |
| 3,295,394 A | * | 1/1967 | Whateley | 475/142 |
| 3,631,741 A | * | 1/1972 | Kelbel | 475/312 |
| 3,978,742 A | * | 9/1976 | Abbott | 475/266 |
| 4,649,771 A | * | 3/1987 | Atkinson et al. | 475/139 |
| 5,607,369 A | * | 3/1997 | Yang | 475/12 |
| 6,066,065 A | * | 5/2000 | Breen | 475/312 |
| 6,149,543 A | * | 11/2000 | Breen | 475/269 |
| 6,910,453 B2 | * | 6/2005 | Sugino et al. | 123/179.28 |

FOREIGN PATENT DOCUMENTS

| | | |
|---|---|---|
| JP | 05-319110 A | 12/1993 |
| KR | 1020130002835 A | 1/2013 |
| KR | 1020130013283 A | 2/2013 |
| KR | 101251809 B1 | 4/2013 |

* cited by examiner

*Primary Examiner* — Dirk Wright
(74) *Attorney, Agent, or Firm* — Morgan, Lewis & Bockius LLP

(57) ABSTRACT

A shifting apparatus for an electric vehicle includes: a sun gear freely rotated on a motor driving shaft of the electric vehicle; a brake device fixed to a transmission housing and fixing the sun gear at the time of being driven; a carrier fixed to the motor driving shaft and moving a planetary gear along the sun gear; a ring gear rotated by the movement of the planetary gear while enclosing the planetary gear; an output gear connected to the ring gear and connected to the motor driving shaft by a one-way clutch; and a controlling part having a first speed mode and a second speed mode and transferring driving force directly to the output gear through the one-way clutch at the time of the first speed mode and driving the brake device at the time of a change to the second speed mode to fix the sun gear.

5 Claims, 5 Drawing Sheets

SHIFTING APPARATUS FOR ELECTRIC VEHICLE

CROSS REFERENCE TO RELATED APPLICATION

The present application claims priority of Korean Patent Application Number 10-2013-0123959 filed Oct. 17, 2013, the entire contents of which application is incorporated herein for all purposes by this reference.

BACKGROUND OF INVENTION

1. Field of Invention

The present invention relates to a shifting apparatus for an electric vehicle capable of improving driving performance of the electric vehicle.

2. Description of Related Art

Due to a global high oil price and regulation, fuel efficiency improvement and an environment-friendly feature have been the core issues in developing a vehicle. Advanced vehicle makers have been concentrated on development of technologies for decreasing fuel in order to accomplish the above-mentioned objects. A typical example of these technologies may include an electric vehicle. An electric vehicle to be stated below, which indicates a vehicle driven using an electric motor, may be understood to be a vehicle accumulating electricity and driving a motor through the electricity to transfer driving force to the vehicle, such as a hybrid vehicle, a fuel cell vehicle, an electric battery vehicle, and the like.

Generally, in a driving scheme of using the motor, a decelerator decelerating a rotation speed of the motor so as to be appropriate for driving of the vehicle is used. The decelerator includes a gear additionally disposed between a driving shaft side gear connected to a driving shaft of the motor and an output shaft side gear connected to a drive wheel of the vehicle and having a separate deceleration ratio to perform an output in the state in which a rotation speed of the motor driving shaft is decreased at an output shaft.

However, in the scheme of the decelerator as described above, at the time of acceleration and high speed driving of the electric vehicle, only the rotation speed of the motor driving shaft is increased, thereby enabling accelerating and high speed driving of the vehicle. Therefore, inevitably, a large amount of electricity is required in order to rapidly rotate the motor at the time of high speed driving of the vehicle. In addition, since there is a limitation in a rotation speed of the motor, there is also a limitation in a maximum speed of the vehicle.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a shifting apparatus for an electric vehicle capable of increasing a maximum speed of the electric vehicle and improving efficiency of a motor by including a two-stage shifting gear having different shifting ratios to change a rotation speed of an output shaft depending on circumstances.

Various aspects of the present invention provide for a shifting apparatus for an electric vehicle, including: a sun gear freely rotated on a motor driving shaft of the electric vehicle; a brake device fixed to a transmission housing and fixing the sun gear at the time of being driven; a carrier fixed to the motor driving shaft and moving a planetary gear along the sun gear; a ring gear rotated by the movement of the planetary gear while enclosing the planetary gear; an output gear connected to the ring gear and connected to the motor driving shaft by a one-way clutch; and a controlling part having a first speed mode and a second speed mode and transferring driving force directly to the output gear through the one-way clutch at the time of the first speed mode and driving the brake device at the time of a change to the second speed mode to fix the sun gear, thereby allowing a rotation speed of the output gear to be increased due to the rotation of the ring gear by the carrier.

The sun gear may further include a disk panel coupled to one surface thereof in a circumferential direction and rotated therewith.

The one-way clutch may be formed to transfer driving force of the motor driving shaft to the output gear when a rotation speed of the motor driving shaft is faster than that of the output gear.

The motor driving shaft may further include a dog clutch having one end connected to the motor driving shaft and the other end connected to the output gear to allow the motor driving shaft to be selectively connected in series with the output gear.

The controlling part may engage the dog clutch with the output gear and reversely rotate a motor when a backward movement signal of the electric vehicle is applied, thereby reversely rotating the output gear.

The shifting apparatus for an electric vehicle may further include a clutch driving part engaging the dog clutch with the output gear by an external signal, wherein the controlling part operates the clutch driving part when the backward movement signal of the electric vehicle is applied, thereby engaging the dog clutch with the output gear.

The present methods and apparatuses have other features and advantages apparent from the accompanying drawings, incorporated herein, and below Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
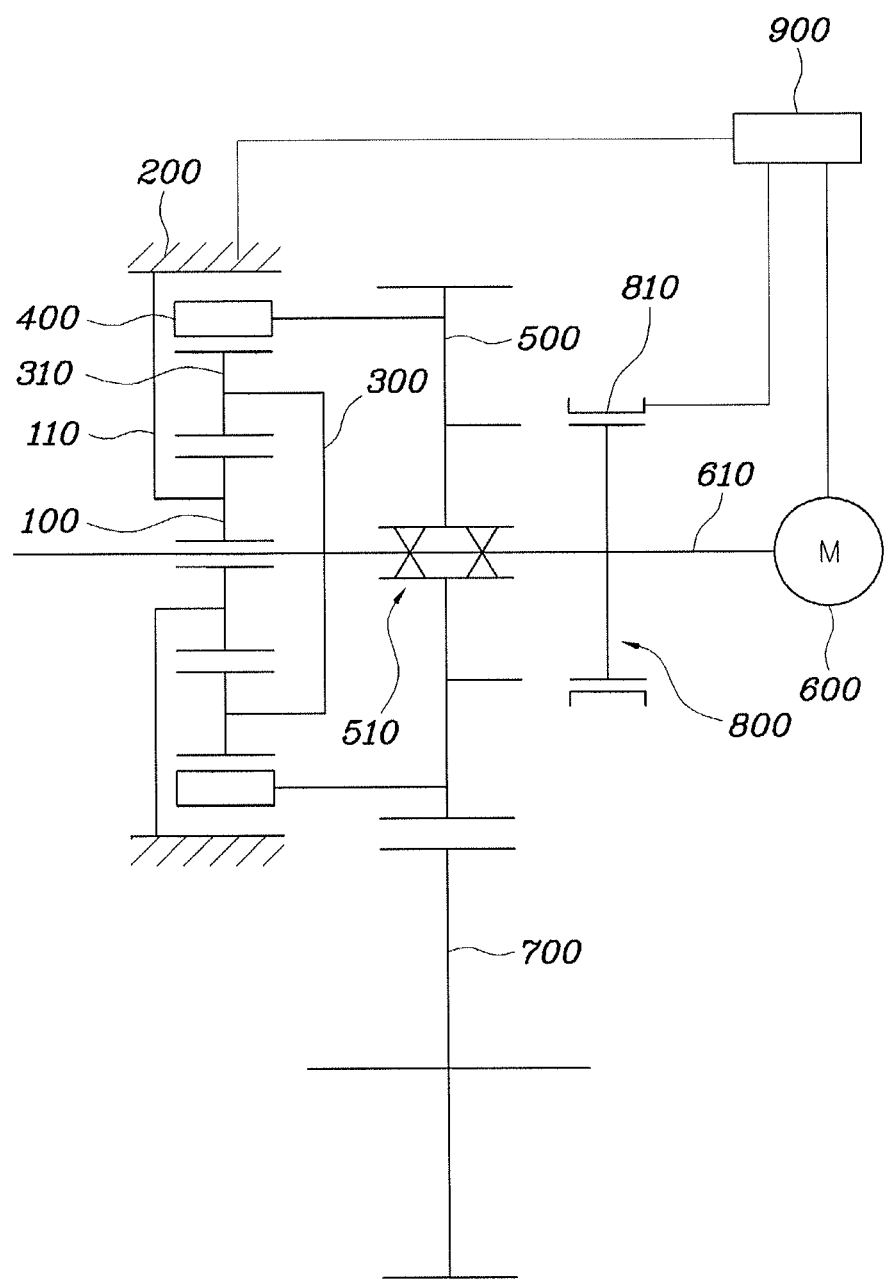
FIG. 1 is a configuration diagram of an exemplary shifting apparatus for an electric vehicle according to the present invention.

FIG. 1 is a configuration diagram of a shifting apparatus for an electric vehicle according to various embodiments of the present invention. Referring to FIG. 1, the shifting apparatus for an electric vehicle according to various embodiments of the present invention is configured to include a sun gear 100 freely rotated on a motor driving shaft 610 of the electric vehicle; a brake device 200 fixed to a transmission housing and fixing the sun gear 100 at the time of being driven; a carrier 300 fixed to the motor driving shaft 610 and moving a planetary gear 310 along the sun gear 100; a ring gear 400 rotated by the movement of the planetary gear 310 while enclosing the planetary gear 310; an output gear 500 connected to the ring gear 400 and connected to the motor driving shaft 610 by a one-way clutch 510; and a controlling part 900 having a first speed mode and a second speed mode and transferring driving force directly to the output gear 500 through the one-way clutch 510 at the time of the first speed mode and driving the brake device 200 at the time of a change to the second speed mode to fix the sun gear 100, thereby allowing a rotation speed of the output gear 500 to be increased due to the rotation of the ring gear 400 by the carrier 300.

More specifically, the sun gear 100 may be formed so as to be freely movable with respect to the motor driving shaft 610. That is, although the sun gear 100 is inserted into and supported by the motor driving shaft 610, it is formed so as to be movable separately from the motor driving shaft 610, such that it may be free with respect to the rotation of the motor driving shaft 610. The sun gear 100 and the motor driving shaft 610 may be simply subjected to lubricating treatment or may have a separate bearing added therebetween.

In addition, the sun gear 100 may include a disk panel 110 coupled to one surface thereof in a circumferential direction and rotated therewith, wherein the disk panel 110 has an inner peripheral surface fixed in the circumferential direction of the sun gear 100 and an outer peripheral surface portion contactable to the brake device 200, such that it strongly friction-contacts the brake device 200 and is fixed to the brake device 200 when the brake device 200 is operated by the controlling part 900, thereby fixing the sun gear 100.

To this end, the brake device 200 may be provided with a friction plate capable of seizing the disk panel 110 and a hydraulic piston operated by the controlling part 900 to press the friction plate.

Meanwhile, the planetary gear 310 is a gear engaged with the sun gear 100 and moved along an outer peripheral surface of the sun gear 100. A plurality of planetary gears 310 may be rotated in the state in which they are spaced apart from each other by a predetermined interval, and the respective planetary gears 310 may be connected to the motor driving shaft 610 through the carrier 300 having one end coupled to the center thereof and the other end fixed to the motor fixing shaft 610.

Therefore, when the motor driving shaft 610 is rotated, the carrier 300 is rotated, and the center of the planetary gear 310 is moved in a rotation direction of the carrier 300 depending on the rotation of the carrier 300, such that the planetary gear 310 is moved along the outer peripheral surface of the sun gear 100.

Meanwhile, the ring gear 400, which is a gear having an inner peripheral surface engaged with the planetary gears 310, is rotated together with the planetary gears 310 depending on the rotation of the planetary gears 310.

Due to characteristics of the planetary gear 310, when the sun gear 100 is fixed, since a gear ratio between the ring gear 400 and the carrier 300 is [the number of teeth of the ring gear/(the number of teeth of the ring gear +the number of teeth of the sun gear)], the number of gears of the ring gear 400 is always smaller than that of gears of the carrier 300. Therefore, if the carrier 300 is rotated when the sun gear 100 is fixed, the ring gear 400 is rotated at a speed faster than a rotation speed of the carrier 300.

Therefore, a rotation speed of the output gear 500 may become faster than that of the motor driving shaft 610 by the carrier 300 and the ring gear 400. As a result, a maximum speed of the vehicle may be increased.

Meanwhile, the output gear 500, which is a gear connected to a driving gear 700 transferring power to a driving wheel of the electric vehicle, finally outputs the driving power generated by the motor driving shaft 610.

The output gear 500 may be connected to both of the ring gear 400 and the motor driving shaft 610. The output gear may be fixedly coupled to the ring gear 400 and is connected to the motor driving shaft 610 by the one-way clutch 510.

Figure 2:
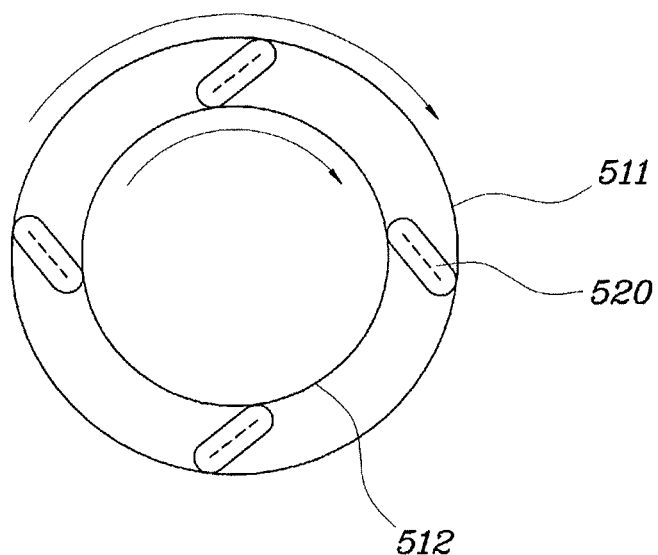
FIG. 2 is a diagram showing a one-way clutch of the exemplary shifting apparatus for an electric vehicle according to the present invention.

Hereinafter, the one-way clutch 510 will be described with reference to FIG. 2. The one-way clutch 510 has an inner peripheral surface 512 connected to the motor driving shaft 610 and an outer peripheral surface 511 connected to the output gear 500 and includes an inclined resistor 520 disposed between the inner peripheral surface 512 and the outer peripheral surface 511 and enabling rotation in one direction.

The resistor 520 has the center fixed to a housing enclosing the one-way clutch 510, such that it may be rotated within a predetermined range. In the case in which a rotation speed of the outer peripheral surface 511 is faster than that of the inner peripheral surface, since the resistor 520 is rotated horizontally, it does not act as a resistor, such that the outer peripheral surface 511 may be freely rotated.

On the other hand, when a rotation speed of the inner peripheral surface 512 is faster than that of the outer peripheral surface 511, the resistor 520 is rotated vertically. Therefore, as the resistor 520 is rotated, it is gradually more strongly fixed to the outer peripheral surface 511, such that it is rotated with the outer peripheral surface 511.

In other words, when the rotation speed of the inner peripheral surface 512 is faster than that of the outer peripheral surface 511, the outer peripheral surface 511 may be rotated together with the inner peripheral surface 512 at the same speed as the rotation speed of the inner peripheral surface 512, and when the rotation speed of the outer peripheral surface 511 is faster than that of the inner peripheral surface 512, the outer peripheral surface 511 may be freely rotated.

This corresponds to the case in which one end of the resistor 520 contacting the outer peripheral surface 511 is in the state in which it is inclined toward a rotation direction of the motor driving shaft 610. If one end of the resistor 520 is not inclined toward the rotation direction of the motor driving shaft 610, when the rotation speed of the outer peripheral surface 511 is faster than that of the inner peripheral surface 512, the inner peripheral surface 512 is rotated together with the outer peripheral surface 511 at the same speed as the rotation speed of the outer peripheral surface 511, and when the rotation speed of the inner peripheral surface 512 is faster than that of the output peripheral surface 511, the inner peripheral surface 512 is freely rotated.

Therefore, the one-way clutch 510 configured as described above may transfer the driving force of the motor driving shaft 610 to the output gear 500 when a rotation speed of the motor driving shaft 610 is faster than that of the output gear 500.

In various embodiments, the case in which one end of the resistor 520 is in the state in which it is inclined toward the rotation direction of the motor driving shaft 610 will be considered.

Figure 3:
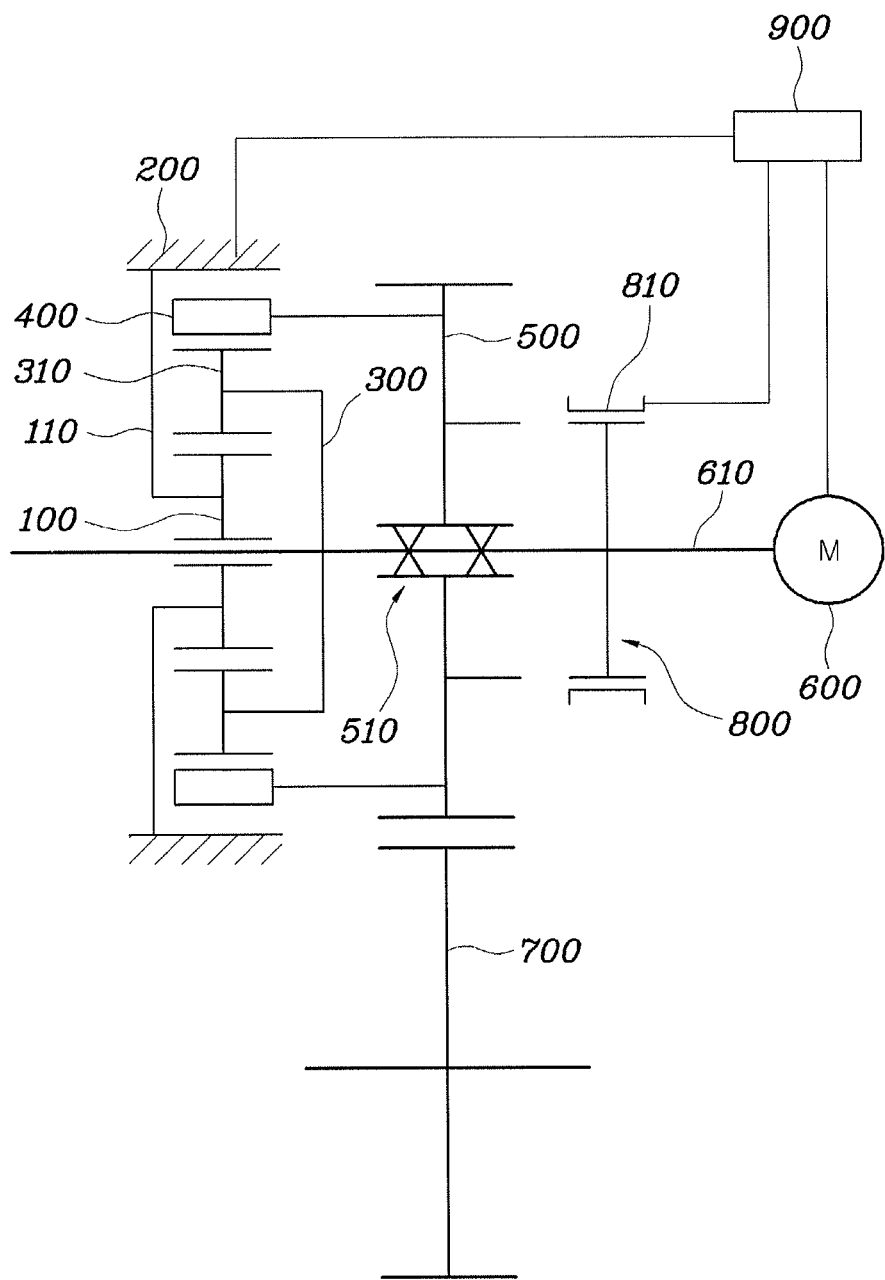
FIG. 3 is a diagram showing a power transfer path when the exemplary shifting apparatus for an electric vehicle according to the present invention is in a first speed mode.

Next, a power transfer path when the shifting apparatus for an electric vehicle according to various embodiments of the present invention is in a first speed mode will be described with reference to FIG. 3 (in FIG. 3, the power transfer path when the shifting apparatus for an electric vehicle is in the first speed mode is represented by arrows).

In the case in which the shifting apparatus for an electric vehicle is in the first speed mode, the controlling part 900 does not operate the brake device 200. Therefore, the sun gear 100 is in the state in which it may be freely rotated.

Since the sun gear 100 is in the state in which it is freely rotated, even though the carrier 300 fixed to the motor driving shaft 610 to thereby be always rotated at the time of rotation of the motor driving shaft 610 is rotated to rotate the planetary gear 310, the sun gear 100 is rotated, such that the power is not transferred to the ring gear 400.

Therefore, since a rotation speed of the ring gear 400 is slower than that of the motor driving shaft 610, a rotation speed of the output gear 500 connected to the ring gear 400 is also slower than that of the motor driving shaft 610 and the rotation speed of the outer peripheral surface of the one-way clutch 510 is slower than that of the inner peripheral surface thereof, such that the motor driving shaft 610 pulls the output gear 500 to rotate the output gear 500. That is, the power is transferred from the motor driving shaft 610 to the output gear 500. Therefore, in the case in which the shifting apparatus for an electric vehicle is in the first speed mode, the output gear 500 is rotated at the same speed as the rotation speed of the motor driving shaft 610, such that the power is transferred to the driving gear 700.

Figure 4:
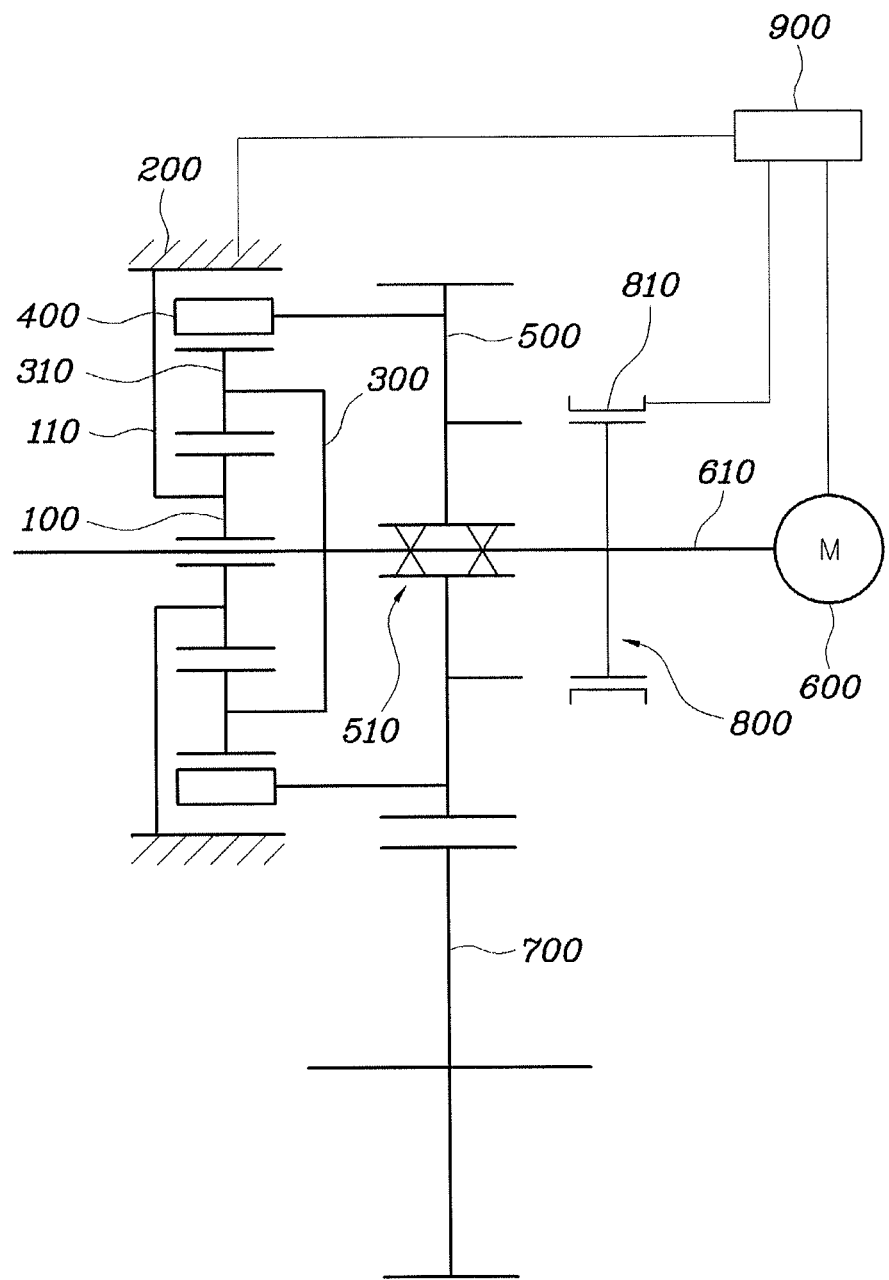
FIG. 4 is a diagram showing a power transfer path when the exemplary shifting apparatus for an electric vehicle according to the present invention is in a second speed mode.

Meanwhile, FIG. 4 is a diagram showing a power transfer path when the shifting apparatus for an electric vehicle according to various embodiments of the present invention is in a second speed mode. In the case in which the shifting apparatus for an electric vehicle is in the second speed mode, the controlling part 900 operates the brake device 200, such that the brake device 200 friction-contacts the disk panel 110 to fix the disk panel 110, thereby allowing the sun gear 100 not to be rotated any more (in FIG. 4, the power transfer path when the shifting apparatus for an electric vehicle is in the second speed mode is represented by arrows).

In this case, since the sun gear 100 is not rotated, rotational force of the planetary gear 310 depending on the rotation of the carrier 300 is transferred to the ring gear 400, such that the ring gear 400 is rotated at a speed increased as compared with the rotation speed of the motor driving shaft 610 depending on a gear ratio. Since the ring gear 400 is rotated at the increased speed, the output gear 500 connected to the ring gear 400 is also rotated at a speed faster than the rotation speed of the motor driving shaft 610 and the outer peripheral surface 511 of the one-way clutch 510 is rotated at a speed faster than the rotation speed of the inner peripheral surface 512 of the one-way clutch 510, such that the outer peripheral surface 511 is not restricted by the rotation speed of the inner peripheral surface 512. As a result, the output gear 500 is rotated at a speed faster than the rotation speed of the motor driving shaft 610.

Meanwhile, the motor driving shaft 610 may include a dog clutch 800 having one end connected to the motor driving shaft 610 and the other end connected to the output gear 500 to allow the motor driving shaft 610 to be selectively connected in series with the output gear 500.

Figure 5C:
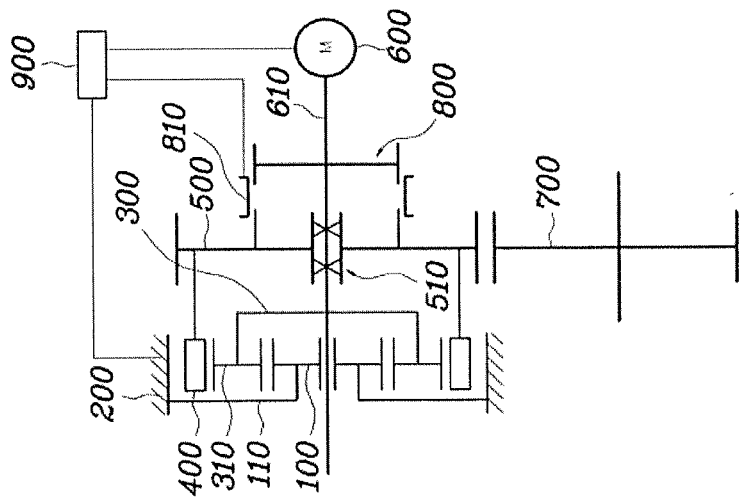
FIG. 5A, FIG. 5B and FIG. 5C are diagrams showing an operating process of the exemplary shifting apparatus for an electric vehicle according to the present invention at the time of backward movement of the electric vehicle.
Figure 5B:
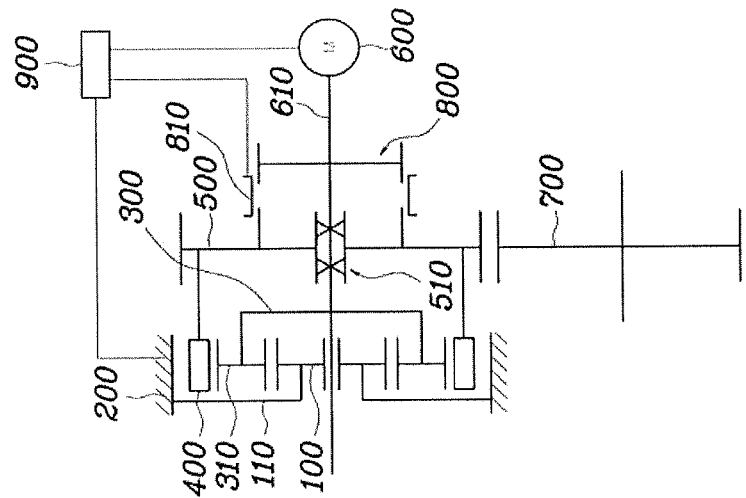
Figure 5A:
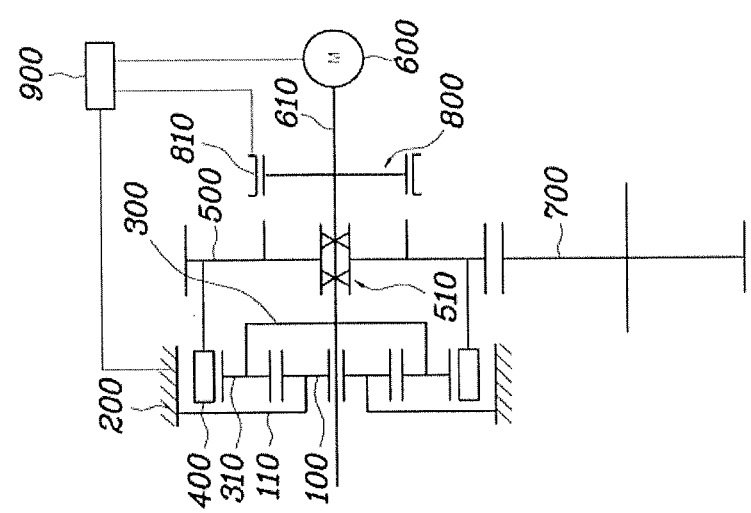

FIGS. 5A to 5C are diagrams showing an operating process of the shifting apparatus for an electric vehicle according to various embodiments of the present invention at the time of backward movement of the electric vehicle; wherein FIG. 5A shows a form in which the shifting apparatus for an electric vehicle is in a neutral state; FIG. 5B shows a form in which the motor driving shaft 610 is connected to the output gear 500 by the dog clutch 800; and FIG. 5C shows a form in which a motor 600 is rotated reversely (in FIG. 5C, a power transfer path at the time of backward movement of the electric vehicle is represented by arrows).

The dog clutch 800 transfers the rotational force of the motor driving shaft 610 to the output gear 500 depending on movement of a dog clutch sleeve 810 to the output gear 500. The dog clutch 800 is a device in which an input shaft and an output shaft are separately rotated at a normal time and rotational force of the input shaft is transferred to the output shaft when the dog clutch sleeve 810 connecting the input shaft and the output shaft to each other is moved to connect the input shaft and the output shaft to each other.

Since the dog clutch 800 is a component that has been used in the related art, a detailed description of an operation of dog clutch 800 will be omitted.

The shifting apparatus for an electric vehicle according to the exemplary embodiment of the present invention may further include a clutch driving part engaging the dog clutch 800 with the output gear 500 by an external signal in order for the dog clutch 800 to transfer the power of the motor driving shaft 610 to the output gear 500. The clutch driving part may include an operation motor connected to the dog clutch sleeve 810 to move the dog clutch sleeve 810 depending on an operation signal of the controlling part 900 to connect the motor driving shaft 610 and the output gear 500 to each other. Alternatively, the dog clutch sleeve 810 may also be moved by hydraulic pressure. Alternatively, the dog clutch sleeve 810 is mechanically connected directly to a shifting lever, such that it may be moved by movement of the shifting lever.

The controlling part 900 may operate the clutch driving part when a backward movement signal of the electric vehicle is applied from a transmission controlling part or a shifting lever, thereby allowing the dog clutch 800 to be engaged with the output gear 500. The reason is that it is necessary to connect the motor driving shaft 610 and the output gear 500 in series with each other in order to reversely rotate the motor 600 to reversely rotate the output gear 500, at the time of applying the backward movement signal of the electric vehicle.

At a normal time, the dog clutch 800 allows the motor driving shaft 610 and the output gear 500 not to be connected to each other, thereby making it possible to implement the first speed mode and the second speed mode; however, at the time of the backward movement of the electric vehicle, the dog clutch 800 allows the motor driving shaft 610 and the output gear 500 to be connected to each other, such that the electrical vehicle may be moved backward only by reverse rotation of the motor 600, thereby making it possible to simplify a configuration.

It is preferable that the brake device 200 is not operated at the time of the backward movement of the electric vehicle, such that the sun gear 100 is freely rotated.

With the shifting apparatus for an electric vehicle having the structure as described above, a maximum speed of the electric vehicle may be increased and efficiency of the motor 600 may be improved, as compared with a decelerator.

In addition, since different gear ratios may be used at a low speed and a high speed, acceleration ability and climbing ability may be improved, as compared with the decelerator.

Further, a cost may be decreased and a control process may be simplified, by a simple structure.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shifting apparatus for an electric vehicle, comprising:
    a sun gear freely rotating about a motor driving shaft of the electric vehicle;
    a brake device fixed to a transmission housing and selectively fixing the sun gear while the motor is driven;
    a carrier fixed to the motor driving shaft and supporting a planetary gear engaging the sun gear;
    a ring gear engaging the planetary gear while enclosing the planetary gear;
    an output gear connected to the ring gear and connected to the motor driving shaft by a one-way clutch; and
    a controller having a first speed mode and a second speed mode, wherein driving force is directly transferred to the output gear through the one-way clutch in the first speed mode, wherein the brake device is engaged in the second speed mode fixing the sun gear with respect to the transmission housing thereby allowing a rotation speed of the output gear to be increased due to the rotation of the ring gear by the planetary gear, and
    wherein the motor driving shaft further includes a dog clutch disposed between the motor driving shaft and the output gear to allow the motor driving shaft to selectively connect with the output gear.

2. The shifting apparatus for an electric vehicle according to claim 1, wherein the sun gear further includes a brake disk coupled to one surface thereof in a circumferential direction and rotated therewith.

3. The shifting apparatus for an electric vehicle according to claim 1, wherein the one-way clutch transfers driving force of the motor driving shaft to the output gear when a rotation speed of the motor driving shaft is faster than that of the output gear.

4. The shifting apparatus for an electric vehicle according to claim 1, wherein the controller engages the dog clutch with the output gear and reversely rotates the motor when the electric vehicle is in a reverse mode, thereby reversely rotating the output gear.

5. The shifting apparatus for an electric vehicle according to claim 4, further comprising an actuated dog clutch sleeve engaging the dog clutch with the output gear by an external signal, wherein the controller operates engages the dog clutch sleeve when the electric vehicle is in a reverse mode to directly connect the motor driving shaft with the output gear.

* * * * *